United States Patent Office 3,006,761
Patented Oct. 31, 1961

3,006,761
POLYETHYLENE TEREPHTHALATE
SHEET MATERIAL
Maximilian Karl Reichel and Wilhelm Neugebauer, Wiesbaden-Biebrich, Germany, assignors to Kalle Aktiengesellschaft, Wiesbaden-Biebrich, Germany, a corporation of Germany
No Drawing. Filed Sept. 5, 1957, Ser. No. 682,087
Claims priority, application Germany Sept. 7, 1956
2 Claims. (Cl. 96—75)

The present invention relates to plastic sheets made from polyethylene terephthalate. More particularly it is concerned with polyethylene terephthalate sheets which are directly coated with a superpolyamide coating; in other words, where the coating is applied to the polyterephthalate sheet without using an anchoring agent or an adhesive.

Sheets of polyethylene terephthalate possess some very valuable properties and are, in various respects, superior to sheets of plastic material of different chemical composition. They are of particular technical and commercial value if they have first been stretched—if desired to a multiple of their original dimension—and then dimensionally stabilized by heating. The surface of these stretched sheets is extremely resistant to external factors and the sheets are further distinguished by their especially good dimensional stability. It is, however, difficult to combine them permanently with one another or with other substances. As a result, their utility is decreased or even eliminated for certain industrial applications. For example, they cannot be welded together in a satisfactory manner and are difficult to work up into so-called compound or laminated sheets. Nor has it hitherto been possible directly to provide them, in an industrially satisfactory manner, with photosensitive coatings; a use which is of great practical interest in manifolding work.

In all the aforesaid cases it has hitherto been necessary to provide the surface of these sheets with an auxiliary or adhesive coating on which the desired coating, for example a photographic gelatin film, is produced.

The present invention provides for the production of compound or laminated sheets by directly coating sheets of polyethylene terephthalate with superpolyamides. It has been found that such sheets of polyethylene terephthalate, coated with superpolyamides, form a very strong combination with one another which combination is resistant to stresses of all kinds.

The material according to the present invention is, for example, extremely well suited for fusing or heat-sealing sheets of polyethylene terephthalate. It thus facilitates and simplifies the use of this high-grade polyester film for numerous industrial applications such as the packing of goods or the insulation of electrical apparatus.

The superpolyamides are likewise high-grade plastics so that the combination of a film of polyethylene terephthalate and superpolyamide results in a product of special utility which constitutes a notable industrial advance. Superpolyamides can, for example, be fixed by being exposed to light in the presence of certain substances sensitive to light so that the materials of the invention, after photosensitization of the superpolyamide surface, can be used for manifolding work without requiring additional layers.

The superpolyamides may be applied either in the form of solutions or from the melt to stretched or unstretched sheets of polyethylene terephthalate.

The preparation and the properties of the superpolyamides have been described in detail in the literature. Owing to the different properties of the superpolyamides, the materials of the invention can be largely differentiated according to their intended industrial use. For the coating there can therefore be used polyamides obtained from amino-carboxylic acids or from their lactams, as well as polycondensates obtained from $\omega,\omega'$-diamides and $\omega,\omega'$-dicarboxylic acids; also polyamides that are mixed condensates of amino-carboxylic acids with the aforesaid diamine dicarboxylic acid reaction products.

The carbon chains of the diamines and dicarboxylic acids may be interrupted by intermediate members such as O, S or NH; the polyamides may be alkylated or alkoxyalkylated at the nitrogen atom, the degree of substitution ranging preferably from 30 to 40%.

Especially suitable superpolyamides are mixed condensates of aliphatic $\omega,\omega'$-aminocarboxylic acids or their esters, lactams and amides with aliphatic $\omega,\omega'$-dicarboxylic acids containing 6 to 11 carbon atoms and $\omega,\omega'$-diamines of the aliphatic series containing at least 5 carbon atoms or aromatic diamines of hydrogenated diarylmethanes. In the preparation of these mixed condensates the $\omega,\omega'$-diamines and $\omega,\omega'$-dicarboxylic acids are, in all cases, used in equimolecular proportions for the polycondensation. Their quantitative relation to the $\omega,\omega'$-aminocarboxylic acid should be such that the melting point of the mixed polycondensate is in the vicinity of its eutectic value and corresponds to the highest possible solubility in mixtures with aliphatic alcohols with water. The quantity of aminocarboxylic acids is preferably within the range from 20 to 50%.

The following examples serve to illustrate the invention but they are not intended to limit it thereto. The parts are by weight, unless otherwise stated:

*Example 1*

In ethyl alcohol of 90 to 96% strength there are dissolved (a) the superpolyamide obtained by condensation of equal parts by weight of the adipic acid salt of hexamethylene diamine, the adipic acid salt of 4,4'-diamino-dicyclohexylmethane and ε-caprolactam and (b) the sodium salt of 4,4'-diazidostilbene-2,2'-disulfonic acid; the constituents a and b being used in such a quantity that an ethyl alcoholic solution containing 2% of the polyamide and 1% of the diazido compound is obtained.

The superpolyamide is prepared as follows:

Aqueous solutions of the reaction components mentioned above sub (a) are thoroughly mixed and heated to a temperature of 260–270° C. in an autoclave, the air being completely replaced by an atmosphere of pure nitrogen. The heating is continued until all the water formed during the condensation of the polyamide has evaporated. For the formation of the polyamide a long period of time is necessary. The reaction mixture is finally poured into alcohol. The polyamide is precipitated in the form of a white crystalline powder.

2 gs. of the above described polyamide are dissolved in 80 cc. of 96% ethyl alcohol and 1 g. of the sodium salt of 4,4'-diazidostilbene-2,2'-disulfonic acid is dissolved in 10 cc. of a 50% ethyl alcohol. Said solutions are then mixed and the mixture is brought up to a total volume of 100 cc. with 96% ethyl alcohol.

A biaxially stretched sheet of polyethylene terephthalate is coated, either by immersion or by means of a spray gun, with the solution so obtained, and thus simultaneously photosensitized. After the solution has been applied to the sheet, the latter is dried at 95° to 100° C. in a drying chamber and exposed to light under a master.

When a closed carbon arc lamp is used, for example a lamp of 18 amperes at a distance of about 70 cm., a fixed image is obtained after 30 to 60 seconds of exposure. The parts of the coating that have not been exposed to light are removed by washing or spraying off at room temperature with ethyl alcohol of 60 to 90% strength. The fixed image thus developed is then dyed with a 0.25% aqueous solution of methyl violet (Schultz, "Farbstofftabellen," 7th edition, vol. I, page 327, No. 783), methylene blue (Schultz, "Farbstofftabellen," 7th edition, vol. I, page 449, No. 1038), methylene green (Schultz, "Farbstofftabellen," 7th edition, vol. I, page 451, No. 1040), or thionine blue (Schultz, "Farbstofftabellen," 7th edition, vol. I, page 452, No. 1042). The sheet is then washed with running tap water and dried. From a negative master a positive image is obtained.

*Example 2*

The process is carried out as described in Example 1, but instead of the polyamide indicated in said example there is used a polyamide which has been prepared from 3 parts by weight of the adipic acid salt of hexamethylene diamine and 2 parts by weight of ε-caprolactam.

*Example 3*

The process is carried out as described in Example 1, but instead of the polyamide used in that example, there is used a polyamide which has been prepared from equal parts by weight of the adipic acid salt of hexamethylene diamine and ε-caprolactam.

*Example 4*

The process is carried out as described in Example 1, but instead of the polyamide indicated in said example a polycaprolactam is used in which 30 to 40% of the nitrogen atoms of the peptide groups are substituted by methoxy methylene groups. These products can be obtained in known manner by reacting polycaprolactam with formaldehyde in a methyl alcoholic solution.

Poly-N-methoxymethyl-ε-caprolactam is prepared in the following manner:

400 g. of ε-polycaprolactam are dissolved at 90° C. in a mixture consisting of 1440 cc. of glacial acetic acid and 80 cc. of distilled water. The reaction mixture is cooled to 70° C. While stirring a solution consisting of 400 g. of paraformaldehyde in 1200 cc. of methanol containing about 0.2–0.3 g. of sodium hydroxide is added dropwise. Subsequently the reaction mixture is kept at 70° C. for about 4 hours while stirring. After cooling to 60° C. the reaction mixture is poured into a solution consisting of 2400 cc. of acetone and 4000 cc. of distilled water, under constant agitation of the solution. The clear solution is made alkaline by the dropwise addition of 2400 cc. of a 26% aqueous ammonia solution at room temperature and using outside cooling. The white flocculent precipitate is sucked off, washed free from ammonia, and dried at 20° C. The reaction product is characterized in that about 30–40% of the nitrogen atoms of the peptide groups have been methoxymethylated by the reaction with paraformaldehyde and methanol.

In the process described above, equivalent quantities of ethyl alcohol or propyl alcohol may be used instead of the methyl alcohol. The resulting reaction products are poly-N-methoxyethyl-ε-caprolactam and poly-N-methoxypropyl-ε-caprolactam, which are as well suited as poly-N-methoxymethyl-ε-caprolactam.

*Example 5*

The process is carried out as described in Example 1, but instead of the polyamide indicated in said example a polycaprolactam is used in which 30 to 40% of the nitrogen atoms of the peptide groups are substituted by methoxy-ethylene groups.

*Example 6*

The process is carried out as described in Example 1, but instead of the polyamide indicated in said example a polyamide is used which has been obtained by condensation of equimolecular quantities of adipic acid and ω,ω'-hexamethylene-diamine, subsequent partial depolymerization and following methoxy-methylation of 30 to 40% of the nitrogen atoms of the peptide groups by subsequent reaction of the polyamide with formaldehyde and methanol.

The methoxy-methylated polyamide is obtained in the same manner as outlined in Example 4 for the preparation of poly-N-methoxymethyl-ε-caprolactam. The polyamide which is subjected to methoxy-methylation is produced by the condensation of equimolecular quantities of adipic acid and ω,ω'-hexamethylene diamine and afterwards partially depolymerized prior to the treatment with paraformaldehyde and methanol. The partial depolymerization of the polyamide is achieved in the following manner:

30 g. of the polyamide obtained by the condensation of equimolecular amounts of adipic acid and ω,ω'-hexamethylene-diamine, the polyamide having a K-value of 71.3 according to the method of Fikentscher (compare: W. Schaefer, Einführung in das Kunststoffgebiet, Akademische Verlagsgesellschaft, Leipzig, 1951, Seite 104) are dissolved at steam-bath temperature while stirring in a solution consisting of 150 cc. of 90% formic acid, 50 cc. of concentrated hydrochloric acid, and 100 cc. of methanol. The solution is kept at steam-bath temperature for 1 hour. Subsequently, the solution is cooled to about 50–60° C. An excess of a 5% aqueous ammonia solution containing 20% by volume of acetone is added dropwise while stirring for the purpose of eliminating the acid reaction of the solution. The precipitated white flocculent polyamide is filtered off, washed neutral with water and dried at 20° C. The polyamide obtained is characterized by the Fikentscher K-value of 55.9 indicating that the original polyamide is partially depolymerized.

*Example 7*

The process is carried out as described in Examples 1 to 6 but instead of the sodium salt of 4,4'-diazidostilbene-2,2'-disulfonic acid so much 4,4'-diazidostilbene is added to the ethyl alcohol that the ethyl alcoholic solution contains 1% of said product.

*Example 8*

The process is carried out as described in Examples 1 and 6 but instead of the sodium salt of 4,4'-diazidostilbene-2,2'-disulfonic acid so much of the sodium salt of 4-azido-benzalacetone-2-sulfonic acid is used that the ethyl alcoholic solution contains 2% of this product. It is also possible to add instead of the sodium salt of 4-azidobenzalacetone-2-sulfonic acid such as amount of 4,4'-diazidostilbene-2,2'-disulfonamide to the polyamide solution that the latter contains 1% of said stilbene-sulfonamide.

*Example 9*

0.1 to 2 grams of the superpolyamide obtained by condensation of equal parts by weight of the adipic acid salt of hexamethylene diamine, the adipic acid salt of 4,4'-diaminodicyclohexylmethane, and ε-caprolactam, are dissolved in 10 cc. of ethyl alcohol or methyl alcohol or isopropyl alcohol of 96% strength, with gentle heating on a steam bath. The solution so obtained is applied to a diaxially stretched film of polyethylene terephthalate and then dried for about 5 to 10 minutes at 95° to 100° C. When instead of the aforesaid polyamide, the polyamide indicated in Examples 2 to 6 are used, similar good results are obtained. The resulting film can be used for hot-sealing.

*Example 10*

A sheet of polyethylene terephthalate which has been provided with a polyamide coating, as described in Example 9, is provided in known manner on its polyamide coated surface with a photographic coating.

*Example 11*

A sheet of polyethylene terephthalate which has been coated with a superpolyamide, as described in Example 9, is coated on its polyamide-coated side with an aqueous light-sensitive solution containing a diazonium compound, an azo coupling component and the additions usual in the manufacture of diazo-type printing material, for example organic acids. After the sensitized side of the sheet has been exposed to light under a master, the sheet is developed with ammonia vapor, an azo-dyestuff image of the master being obtained.

*Example 12*

The proceedings described in Examples 1 to 8 are modified by using as a support for the superpolyamide layer a polyethylene terephthalate film one side of which has superficially been roughened, e.g. by sand blasting with fine sand. The tanned images obtained by exposure of the coated film under originals and subsequent development are extraordinarily fast to abrasion and, due to the fact that the developed images are easily dyed, extremely suitable for the production of dimensionally stable planetable sheets for cartographic purposes.

*Example 13*

The procedures described in Examples 1 to 8 are modified by using as a support for the superpolyamide layer a polyethylene terephthalate film, one side of which has been superficially roughened and the other side backed with a cellulose acetate film.

Obviously many modifications and variations of the present invention are possible in the light of the above teachings. It is, therefore, to be understood that within the scope of the appended claims the invention may be practiced otherwise than as specifically described.

What is claimed is:
1. A base film of oriented polyethylene terephthalate, coated with a uniform continuous layer of a synthetic superpolyamide directly adhered to said base film, said superpolyamide being a linear polycarbonamide containing at least five carbon atoms in the chain of repeating units between the carbonamide groups.
2. A base film of oriented polyethylene terephthalate, coated with a uniform continuous layer of a synthetic superpolyamide directly adhered to said base film, said superpolyamide being a linear polycarbonamide containing at least five carbon atoms in the chain of repeating units between the carbonamide groups, and said superpolyamide having distributed therein a light-sensitive compound capable of hardening the super-polyamide when struck by light.

References Cited in the file of this patent
UNITED STATES PATENTS

| | | |
|---|---|---|
| 2,216,735 | Carothers | Oct. 8, 1940 |
| 2,216,736 | Carothers | Oct. 8, 1940 |
| 2,365,416 | Kuhne | Dec. 19, 1944 |
| 2,627,088 | Alles et al. | Feb. 3, 1953 |
| 2,678,285 | Browning | May 11, 1954 |
| 2,729,565 | Zemp | Jan. 3, 1956 |
| 2,765,251 | Williams | Oct. 2, 1956 |
| 2,801,674 | Siverlick | Aug. 6, 1957 |

FOREIGN PATENTS

| | | |
|---|---|---|
| K22598IVa/57b | Germany | June 14, 1956 |
| T10743IVa/57d | Germany | Dec. 8, 1955 |